(No Model.) 2 Sheets—Sheet 1.
J. M. YOUNG.
CORN PLANTER.
No. 419,095. Patented Jan. 7, 1890.
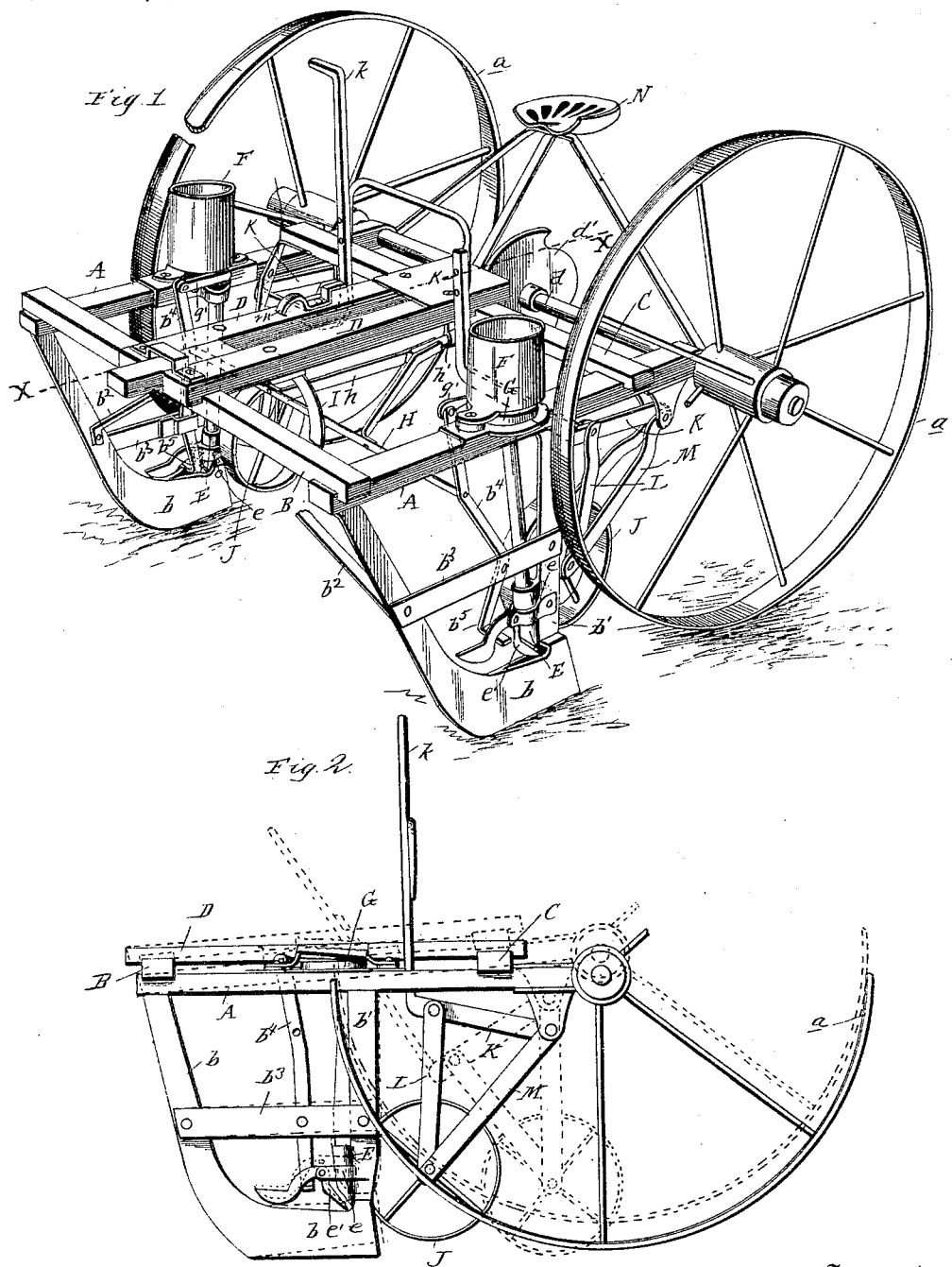
Witnesses
Inventor
Joseph M. Young.
By his Attorneys (No Model.) 2 Sheets—Sheet 2.
J. M. YOUNG.
CORN PLANTER.
No. 419,095. Patented Jan. 7, 1890.
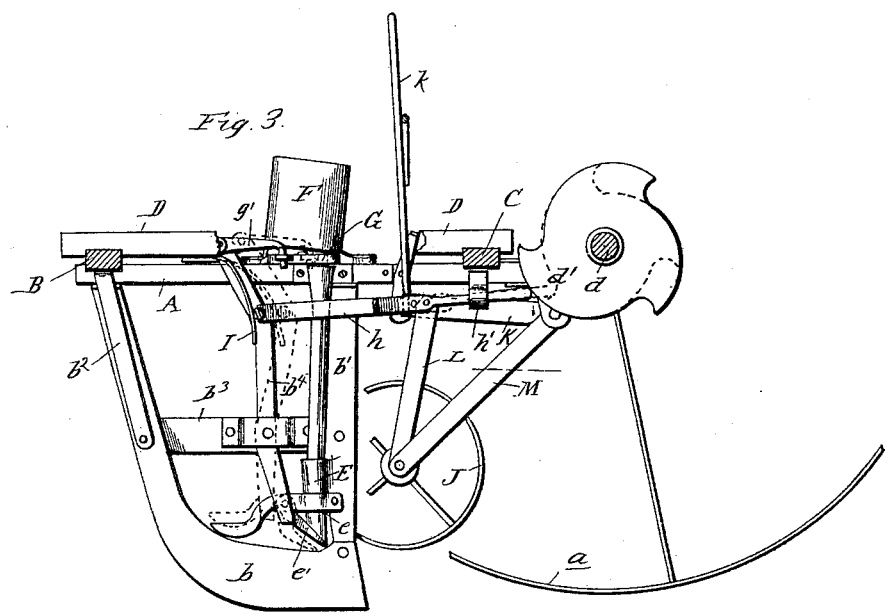
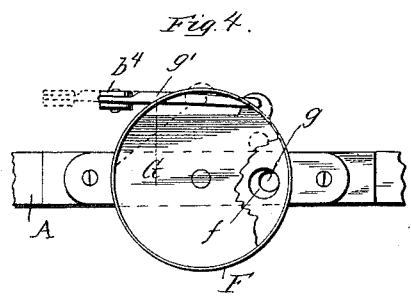
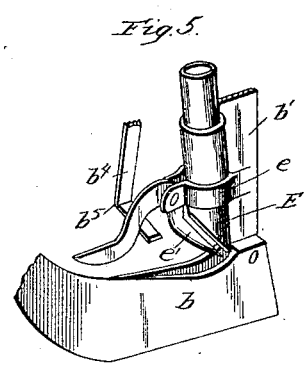
Witnesses:
Inventor.
Joseph M. Young.
By his Attorneys

UNITED STATES PATENT OFFICE.

JOSEPH M. YOUNG, OF TILSON'S MILL, VIRGINIA.

CORN-PLANTER.

SPECIFICATION forming part of Letters Patent No. 419,095, dated January 7, 1890.

Application filed May 1, 1889. Serial No. 309,304. (No model.)

*To all whom it may concern:*

Be it known that I, JOSEPH M. YOUNG, a citizen of the United States, residing at Tilson's Mill, in the county of Bland and State of Virginia, have invented certain new and useful Improvements in Corn-Planters; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to planters which are designed to plant the grain in "checks" or at regular intervals.

The improvement consists of the peculiar construction and combination of the parts, which will be hereinafter more fully described and claimed, and which are shown in the annexed drawings, in which—

Figure 1 is a perspective view of a planter embodying my invention; Fig. 2, a side view of the planter, showing the operation of the carrying-wheels by dotted lines; Fig. 3, a central section about on the line X X of Fig. 1, showing the operation of the dropper mechanism by dotted lines; Fig. 4, a top plan view of a hopper, showing the operation of the seed-dropping plate by dotted lines; Fig. 5, a perspective view of the rear portion of the runner, showing the dropping-nozzle and valve on an enlarged scale.

The frame of the planter is composed of the side bars A, front and rear bars B and C, respectively, and the central bars D, and is supported on the wheels $a$ and the runners $b$. The axle $d$ is provided with the cam-wheel $d'$. The runners are separated or divided at their rear ends and are braced vertically by the stays $b'$ and laterally by the truss-brace $b^2$. The bar $b^3$, extended from the vertical front portion of the runner to the stay $b'$, forms a support for the lever $b^4$, which is pivoted thereto between its ends. The grain-dropping nozzle E is attached to the stay $b'$ by the clip $e$, and its lower end is beveled to form a seat for the valve $e'$, which is pivotally supported between the ends of the clip $e$, substantially as shown. The stem of the valve and the valve form in side elevation an ogee curve, and the bent end $b^5$ of the lever $b^4$ projects across the space between the valve and its stem to open and close said valve at the proper time.

The hoppers F—one for each side of the frame—are supported on the side bars A and have openings $f$ in their bottom. The seed-dropping plate or disk G, arranged between the bottom of the hopper and the top of side bar A, is pivotally connected thereto and has an opening $g$, which corresponds and is adapted to register with the opening $f$, and is connected with the lever $b^4$ by the link $g'$. It will be understood that there is a lever $b^4$ for each side of the planter, and the two levers are connected by the cross-bar H. The push-bar $h$ is divergent at its front end, where it is connected with the cross-bar H, and its rear end passes through the keeper $h'$ on the under side of the rear cross-bar C and presses against the cam-wheel $d'$. The spring I, depending from and fastened to the bars D, bears on the cross-bar H and holds the end of the push-bar $h$ against the said cam-wheel.

The carrying-wheels J are supported between the lower ends of the bars L and M, which are fastened at their upper ends to the arched crank-lever K, that is pivotally connected at its ends to the bars A. The arch of this lever K spans the bars D D and is provided with the hand-lever $k$ to facilitate operating the said crank-lever K. When the lever $k$ is in a vertical position, the carrying-wheels are lifted from the ground, as shown most clearly in Fig. 2, and when turned in a horizontal position the said carrying-wheels are lowered and support the weight of the machine, which was previously imposed on the wheels $a$. The catch $m$ holds the lever $k$ down.

The seat N is arranged directly above the axle to bring the weight on the wheels $a$. The wheels $a$ track in the path of the runners, and their rims curve in between their edges and serve to cover the grain, and may have plates on their outer surface to show where the latter is planted.

The operation of the planting mechanism is as follows: Grain being supplied to the hopper, the machine is drawn over the field, the cam-wheel engaging with the push-bar $h$ drives it forward, and the cross-bar H, being moved forward, operates the levers $b^4$ and effects a closing of the valves $e'$ and a dropping of the grain down the spouts O. The cross-bar H is advanced against the tension of the spring I, and when the push-bar $h$ slips off or past a cam on the said cam-wheel the spring I, reacting, throws the cross-bar H back, opening the valves $e'$ and permitting the grain to drop. When transporting or turning the planter, the carrying-wheels are lowered, thereby lifting the wheels $a$ from the ground.

Having thus described my invention, what I claim, and desire to secure by Letters Patent, is—

1. In a planter, the combination, with the frame supported on wheels $a$, of the lever K, having its ends bent at right angles and its middle deflected to form an arch, the brace-bars L and M, attached at their upper ends to the front and rear ends of the bent ends of the lever K and having their lower ends brought together, and the wheels J, journaled between the lower ends of the brace-bars L and M, substantially as described.

2. In a planter, the combination of the hoppers F F, the grain-nozzles E E, the pivoted valves $e'$, having curved stems, the levers $b^4$, pivoted between their ends, the upper ends of said levers $b^4$ being connected with the said plate in the hopper and the lower ends being bent and adapted to work between the valves $e'$ and the curved valve-stems, the rod H, connecting the levers $b^4$, the spring I, the push-bar $h$, and the operating-cam $d'$, substantially as and for the purpose described.

In testimony whereof I affix my signature in presence of two witnesses.

JOSEPH M. YOUNG.

Witnesses:
CHAS. SPENCE,
E. H. SANDERS.